J. ROBISON.
Upsetting Tires.
No. 36,533.
Patented Sept. 23, 1862.
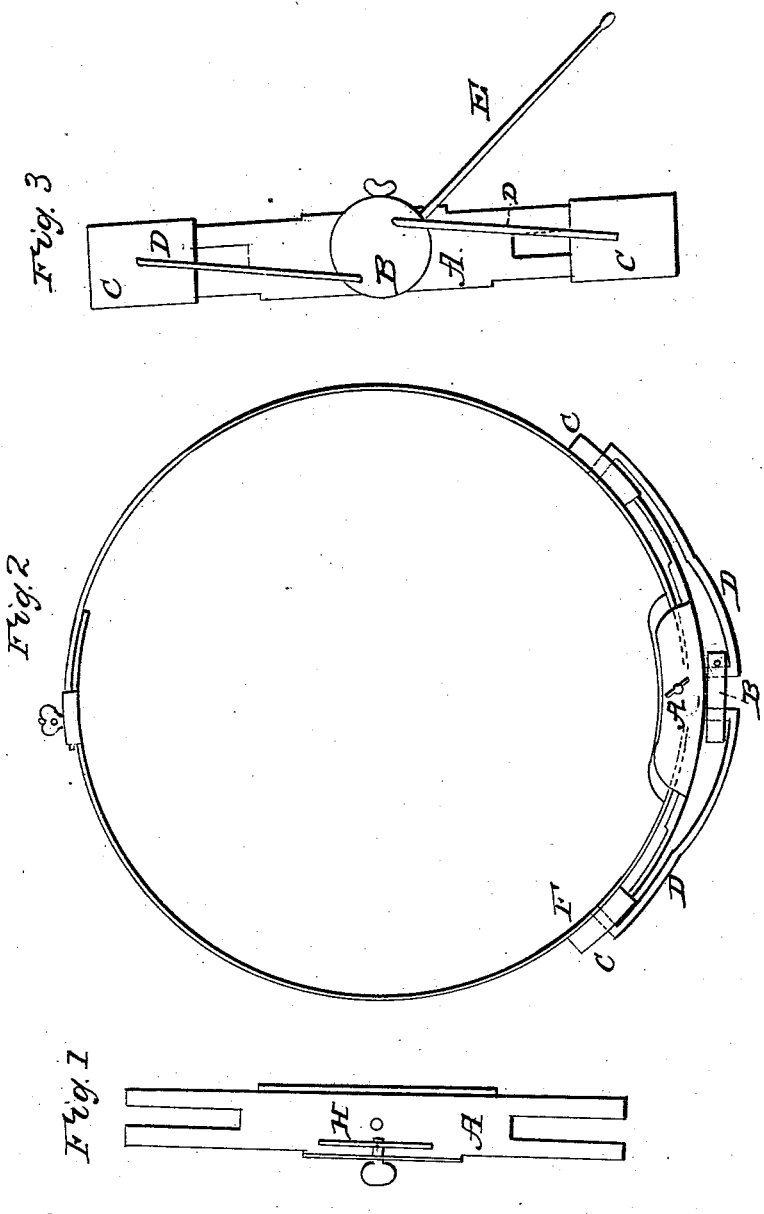
Witnesses
Marquis Robison
Charles Ketcham
Inventor
Joseph Robison

UNITED STATES PATENT OFFICE.

JOSEPH ROBSON, OF POTTER CENTRE, NEW YORK.

IMPROVEMENT IN MACHINES FOR UPSETTING TIRES.

Specification forming part of Letters Patent No. 36,533, dated September 23, 1862.

*To all whom it may concern:*

Be it known that I, JOSEPH ROBSON, of Potter Centre, in the county of Yates and State of New York, have invented a new and Improved Machine for Upsetting or Shrinking Tires; and I do hereby declare that the following is a full, clear, and exact description of the construction and operation of the same, reference being had to the annexed drawings, making a part of this specification, in which—

Figure 1 represents the inside of the base-plate; Fig. 2, the side of the whole machine; Fig. 3, the outside of the base-plate and its attachments.

The letters of reference refer to the same parts in each figure.

A is the base-plate. It is made of iron and in form the segment of a circle. It has a flange at each side. One of the flanges is to hold the tire; the other is to hold a screw that drives the clamp H against the tire. The ends are made in two parallel parts, with their inner edges angular to allow a dovetailed piece to slide between them.

B is a roller. It is pivoted to the outside of the plate A. It is provided with holes on the surface for the connections D and D, and a hole at the periphery for inserting a lever, as shown in Fig. 2.

C and C are sliding clasps. They are made to surround the ends of the plate A, and have dovetailed pieces within them that fit the openings at the ends of the plate A. These pieces are held by bolts or rivets, and through these pieces and the clasps are holes for the ends of the connections D. To the inside of these clasps the ends of the band F are securely fastened.

D and D are connections, one end of which is inserted into the clasps C. The other end is inserted into the roller B in such position that when the roller is turned it will draw the clasps C together or toward each other, and when the roller is turned back it will move the clasps C from each other.

E is a lever of any convenient length or size required. Its use is to turn the roller B.

F is a band that is used to surround the tire. Near the ends they are securely fastened to the clasps C and C. The ends are made tapering, so as to conform to the shape of the tire. Opposite the ends is a sliding joint, which is held by a clasp, G. By means of this the band may be made to suit the dimensions of the tire.

G is a clasp that holds the band F at the joint. It is provided with a set-screw for the purpose of holding the union of the band firmly at any desired place or position.

H is a clamp made to hold the tire against the opposite flange of the plate A. It is moved backward or forward by means of a screw through a flange of the plate A. It aids in holding the tire in position, and prevents the tire from widening while it is being upset or shrinking.

To use my invention, take hold of the lever and turn the roller so as to place the clasps C and C apart; then adjust the band F to near the size of the tire and fasten it; then have the tire heated at the place where it needs shrinking; then place the tire within the machine with the heated part at the flange of the plate A; then force the clamp H up to it; then take hold of the lever and turn the roller so as to draw the clasps C and C toward each other, and with force thus applied the tire may be upset or made to shrink to any size required.

What I claim as my invention, and desire to secure by Letters Patent, is—

1. The plate A when made as specified.
2. The band F, when made as specified and used for the purpose set forth.
3. The roller B, clasps C and C, and connections D and D, when constructed and arranged as and for the purpose specified.

JOSEPH ROBSON.

Witnesses:
WM. COMSTOCK,
CHARLES KETCHUM.